United States Patent
Ye et al.

(10) Patent No.: US 12,325,986 B2
(45) Date of Patent: Jun. 10, 2025

(54) FAUCET

(71) Applicant: Xiamen Lota International Co., Ltd., Fujian (CN)

(72) Inventors: Liming Ye, Fujian (CN); Shuanglin Bai, Fujian (CN); Chuanbao Zhu, Fujian (CN)

(73) Assignee: Xiamen Lota international Co., Ltd., Fujian (CN)

( * ) Notice: Subject to any disclaimer, the term of this patent is extended or adjusted under 35 U.S.C. 154(b) by 142 days.

(21) Appl. No.: 18/369,778

(22) Filed: Sep. 18, 2023

(65) Prior Publication Data
US 2024/0271399 A1      Aug. 15, 2024

(30) Foreign Application Priority Data
Feb. 14, 2023   (CN) .......................... 202320208117.3

(51) Int. Cl.
*E03C 1/048* (2006.01)
*E03C 1/04* (2006.01)

(52) U.S. Cl.
CPC ............ *E03C 1/048* (2013.01); *E03C 1/0403* (2013.01); *E03C 1/0405* (2013.01)

(58) Field of Classification Search
CPC ....... E03C 1/048; E03C 1/0403; E03C 1/0405
USPC ............................................................. 4/676
See application file for complete search history.

(56) References Cited

U.S. PATENT DOCUMENTS

| | | | | |
|---|---|---|---|---|
| 2011/0061754 A1* | 3/2011 | Thomas | .................. | E03C 1/048 |
| | | | | 137/625.29 |
| 2013/0180043 A1* | 7/2013 | Pickle | ..................... | E03C 1/048 |
| | | | | 4/626 |
| 2014/0027372 A1* | 1/2014 | Keiter | ................... | E03C 1/0404 |
| | | | | 210/420 |
| 2023/0332387 A1* | 10/2023 | Yang | ....................... | E03C 1/048 |

* cited by examiner

*Primary Examiner* — Huyen D Le
(74) *Attorney, Agent, or Firm* — Cooper Legal Group, LLC

(57) ABSTRACT

A faucet comprises a faucet body, a water outlet panel, and a panel water outlet pipe. The water outlet panel is configured to be arranged separately from the faucet body, and a valve seat comprises a water passage respectively connected to a first valve and a second valve. The first valve is in communication with hot water and cold water to form mixed water that is in communication with the water passage, and the second valve is configured to receive the mixed water and is configure to be controlled to enable the mixed water to be in communication with the water outlet panel. The faucet body comprises a water outlet terminal, the water outlet panel comprises a water outlet port, and the first valve is configured to be controlled to enable the mixed water to be in communication with the water outlet terminal.

10 Claims, 6 Drawing Sheets

FAUCET

RELATED APPLICATIONS

This application claims priority to Chinese patent application number 202320208117.3, filed on Feb. 14, 2023. Chinese patent application number 202320208117.3 is incorporated herein by reference.

FIELD OF THE DISCLOSURE

The present disclosure relates to a faucet.

BACKGROUND OF THE DISCLOSURE

Existing pull-out faucets comprise a faucet housing, a valve seat, and a valve core. The valve seat is arranged inside the faucet housing, and the valve core is arranged inside the faucet housing and connected to the valve seat. The pull-out faucet also comprises a hot water pipe and a cold water pipe extending from a bottom of the faucet housing, and the hot water pipe and the cold water pipe are respectively connected to the valve seat to be in fluid communication with the valve core, which controls the mixture of hot and cold water flowing out from a single pull-out tube. In this faucet structure, only one water outlet terminal is connected to the pull-out tube. Although multi-outlet faucets have been developed, the multi-outlet faucets involve significant modifications to the original pull-down faucet structure and the addition of switching mechanisms, and the temperature of different water outlet terminals needs to be controlled separately, the operability is poor, and the appearance is poor.

BRIEF SUMMARY OF THE DISCLOSURE

The present disclosure provides a faucet to solve the deficiencies in the background.

In order to solve the technical problem, a first technical solution of the present disclosure is as follows.

A faucet comprises a faucet body, a water outlet panel, and a panel water outlet pipe. The water outlet panel is configured to be arranged separately from the faucet body, and the faucet body comprises a valve seat, a first valve, and a second valve. The first valve and the second valve are respectively connected to the valve seat, and the panel water outlet pipe is connected to the valve seat and the water outlet panel to enable the second valve to be in communication with the water outlet panel. The valve seat comprises a water passage respectively connected to the first valve and the second valve, and the first valve is in communication with hot water and cold water through the valve seat and is configured to be controlled to enable the hot water and the cold water to be mixed in a specific proportion to form mixed water that is in communication with the water passage. The second valve is configured to receive the mixed water and is configure to be controlled to enable the mixed water to be in communication with the water outlet panel, and the faucet body comprises a water outlet terminal. The water outlet panel comprises a water outlet port, and the first valve is configured to be controlled to enable the mixed water to be in communication with the water outlet terminal.

In a preferred embodiment, the water outlet panel is configured to be disposed under the faucet body, and the water outlet panel comprises a through hole extending through the water outlet panel along a thickness direction of the water outlet panel. At least part of the faucet body is configured to pass through the through hole from top to bottom.

In a preferred embodiment, the faucet body comprises a faucet housing, a threaded tube, and a fastening member. A bottom of the faucet housing is connected to the threaded tube, and the threaded tube is configured to pass through the through hole to be connected to the fastening member in a threaded manner. The water outlet panel is configured to be clamped and fixedly connected between the faucet housing and the fastening member.

In a preferred embodiment, the water outlet panel comprises two water connecting holes respectively located on a left side and a right side of the through hole. The two water connecting holes are in communication with the water outlet port, and the panel water outlet pipe is connected to the valve seat and at least one of the two water connecting holes.

In a preferred embodiment, the water outlet panel is disposed adjacent to a side of the faucet body and separately from the faucet body.

In a preferred embodiment, the water outlet panel comprises two water connecting holes located on two sides thereof. The two water connecting holes are connected to the water outlet port, and the panel water outlet pipe is connected to the valve seat and at least one of the two water connecting holes.

In a preferred embodiment, the water outlet port comprises a plurality of water outlet holes, and the plurality of water outlet holes is arranged at intervals along a horizontal direction.

In a preferred embodiment, the valve seat comprises a first mounting surface and a second mounting surface. The first mounting surface is configured for the first valve to be disposed thereon, and the second mounting surface is configured for the second valve to be disposed thereon. The water passage is connected to the first mounting surface and the second mounting surface, and the valve seat further comprises a panel water outlet hole configured for receiving the panel water outlet pipe and connected to the second mounting surface. The panel water outlet pipe is connected to the panel water outlet hole.

In a preferred embodiment, the valve seat is disposed in a faucet housing of the faucet body. The panel water outlet hole faces a bottom of the faucet housing, and the panel water outlet pipe is configured to pass by the bottom of the faucet housing to be connected to the panel water outlet hole.

In a preferred embodiment, the water outlet panel comprises at least one water connecting hole defined on a bottom wall of the water outlet panel, and the faucet body and the water outlet panel are configured to be disposed on a countertop of a kitchen sink. The panel water outlet pipe is configured to be located below of the kitchen sink. A first end of the panel water outlet pipe is connected to the panel water outlet hole, and a second end of the panel water outlet pipe is connected to the at least one water connecting hole.

Compared with the existing techniques, the technical solution has the following advantages.

The water outlet panel is configured to be arranged separately from the faucet body. The faucet body comprises the valve seat, the first valve, and the second valve, and the first valve and the second valve are respectively connected to the valve seat. The panel water outlet pipe is connected to the valve seat and the water outlet panel to enable the second valve to be in communication with the water outlet panel, and the valve seat comprises the water passage respectively connected to the first valve and the second valve. The first valve is in communication with the hot water and the cold water through the valve seat and is configured to be controlled to enable the hot water and the cold water to be mixed in a specific proportion to form the mixed water that is in communication with the water passage. The second valve is configured to receive the mixed water and is configure to be controlled to enable the mixed water to be in communication with the water outlet panel. The faucet body comprises a water outlet terminal, and the water outlet panel comprises a water outlet port. The first valve is configured to be controlled to enable the mixed water to be in communication with the water outlet terminal. Through the arrangement of the valve seat, a water outlet panel can be arranged outside the faucet body, and the mixed water can be formed through the control of the first valve in the faucet body. The water outlet panel is controlled by the second valve on the faucet body. The overall appearance is simple and beautiful, and easy to operate, and the water outlet temperature of the water outlet terminal and the water outlet port are the same.

The water outlet panel is configured to be disposed under the faucet body, and the water outlet panel comprises a through hole extending through the water outlet panel along a thickness direction of the water outlet panel. At least part of the faucet body is configured to pass through the through hole from top to bottom. The arrangement of the through hole allows the water outlet panel to be optionally arranged under the faucet body, or directly allows the water outlet panel to be arranged on one side of the faucet body, and the through hole can be connected to other components accordingly.

The faucet body comprises a faucet housing, a threaded tube, and a fastening member. A bottom of the faucet housing is connected to the threaded tube, and the threaded tube is configured to pass through the through hole to be connected to the fastening member in a threaded manner. The water outlet panel is configured to be clamped and fixedly connected between the faucet housing and the fastening member. The bottom of the faucet housing correspondingly abuts the top wall of the water outlet panel, and the bottom wall of the water outlet panel can correspondingly abut the countertop of the kitchen sink. The threaded tube passes through the through hole and is correspondingly under the countertop of the kitchen sink. The fastening member connected to the threaded tube in a threaded manner can abut a lower side of the countertop of the kitchen sink, and the upper and lower pressing of the faucet housing and the fastening member realizes the fixation of the water outlet panel.

The water outlet panel comprises the two water connecting holes respectively located on the left side and the right side of the through hole, the two water connecting holes are in communication with the water outlet port, and the panel water outlet pipe is connected to the valve seat and at least one of the two water connecting holes, which is convenient to arrange the water outlet panel.

The water outlet panel is disposed adjacent to a side of the faucet body and separately from the faucet body, which can form a larger width of a water flow to flush conveniently.

The water outlet panel comprises at least one water connecting hole defined on a bottom wall of the water outlet panel. The faucet body and the water outlet panel are disposed on a countertop of a kitchen sink, and the panel water outlet pipe is located below of the kitchen sink. A first end of the panel water outlet pipe is connected to the panel water outlet hole, and a second end of the panel water outlet pipe is connected to the at least one water connecting hole. The panel water outlet pipe is located below of the kitchen sink, and the water outlet panel and the faucet body on the countertop have a clean appearance.

DETAILED DESCRIPTION OF THE EMBODIMENTS

Figure 1:
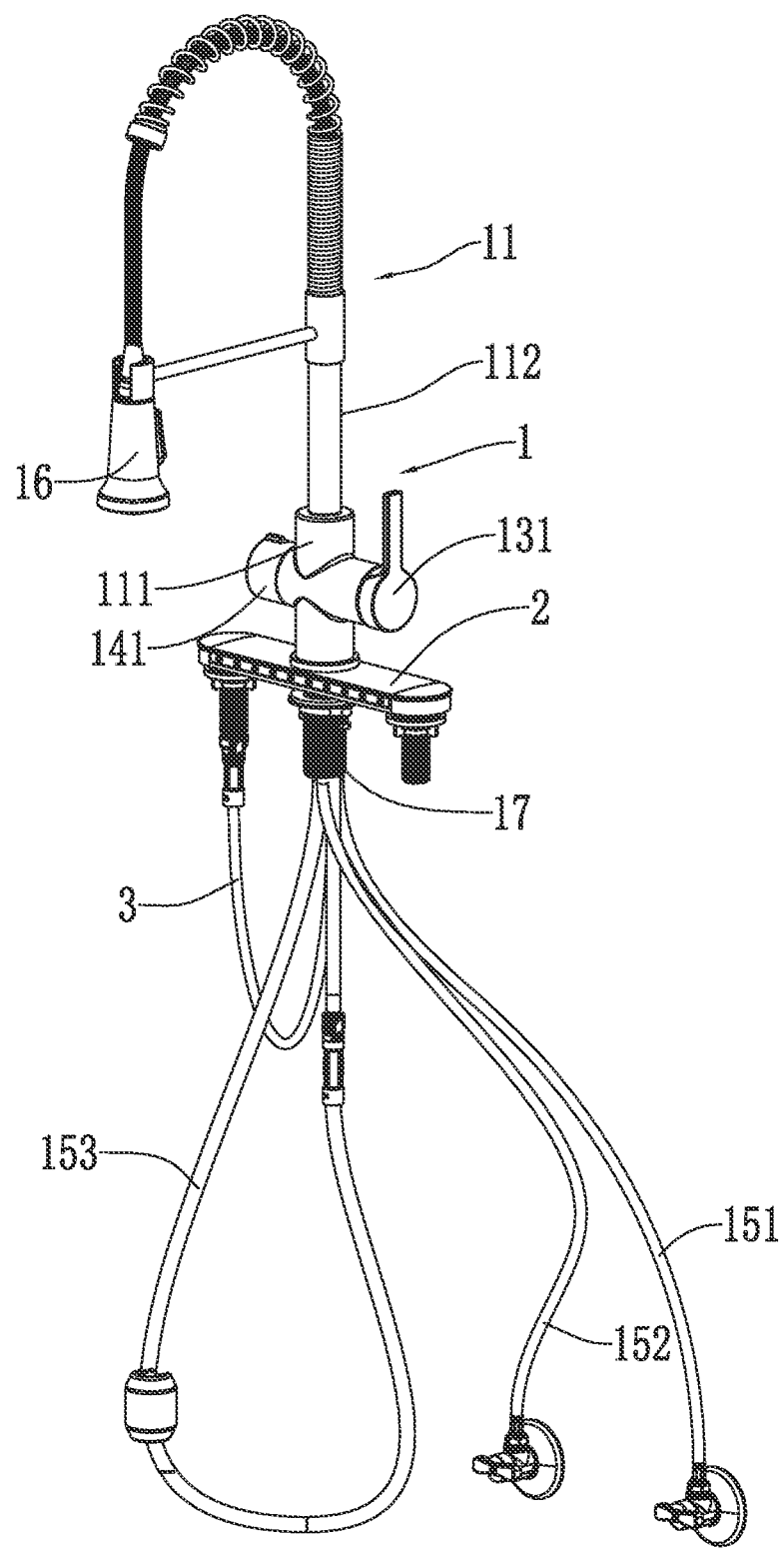
FIG. 1 illustrates a perspective view of a faucet in a preferred embodiment in the present disclosure.
Figure 2:
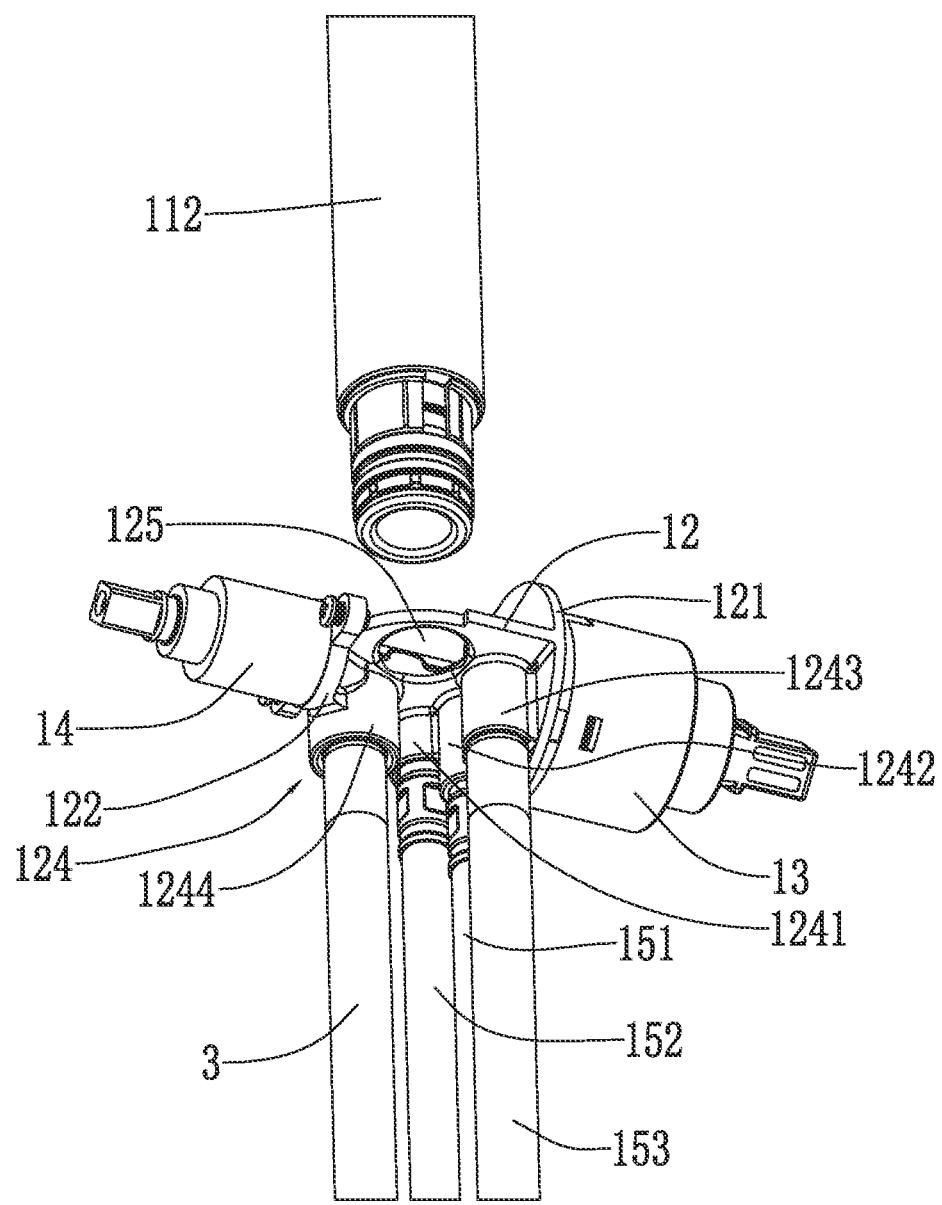
FIG. 2 illustrates a perspective view of a valve seat, a first valve, and a second valve in a preferred embodiment in the present disclosure.
Figure 3:
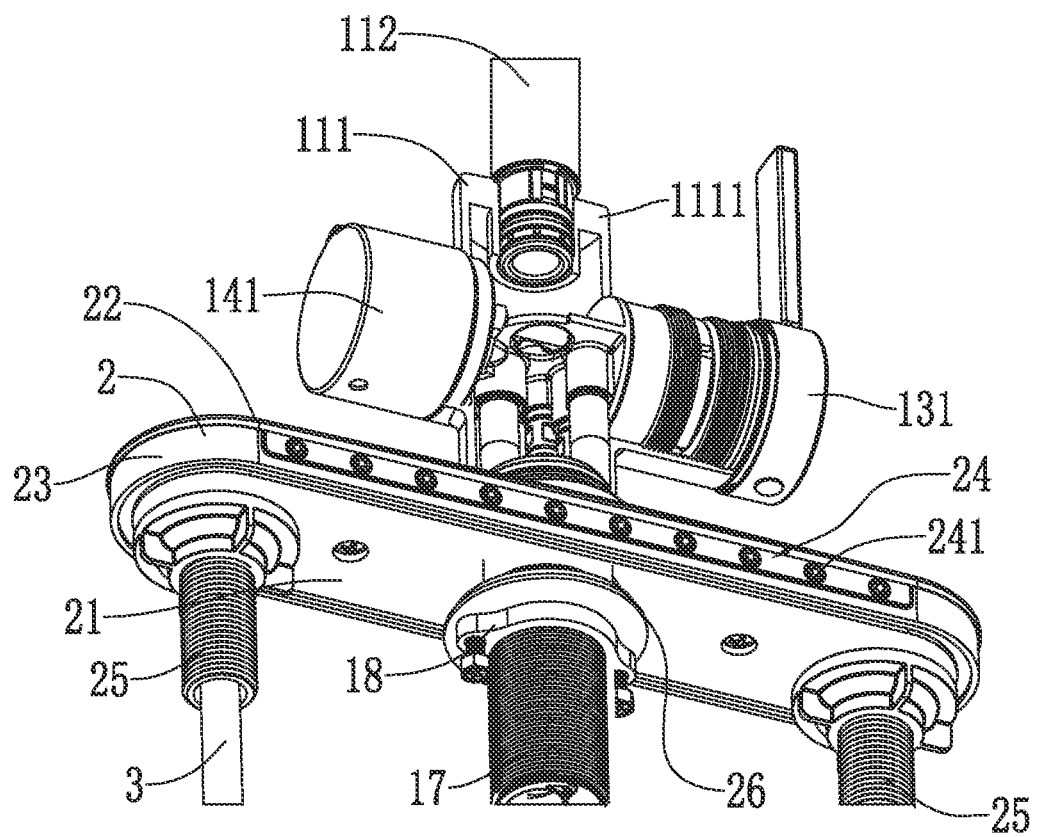
FIG. 3 illustrates a perspective view of a faucet body with a half of a base removed and a water outlet panel in a preferred embodiment in the present disclosure.
Figure 4:
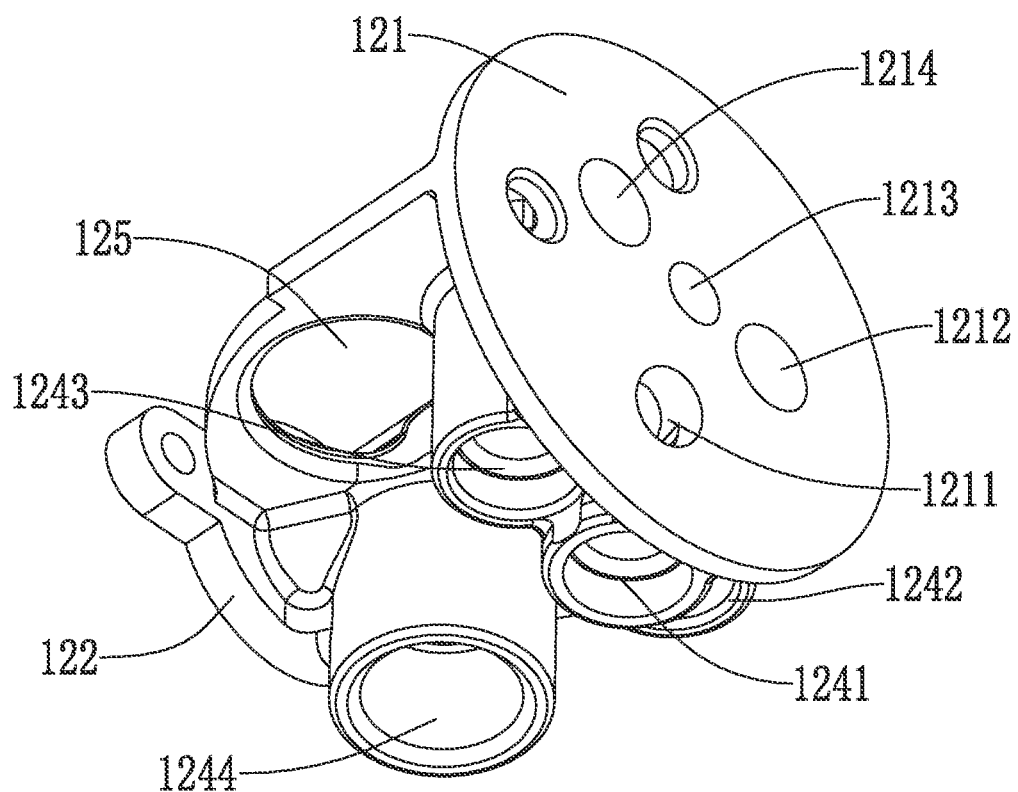
FIG. 4 illustrates a perspective view of a valve seat in a preferred embodiment in the present disclosure.
Figure 5:
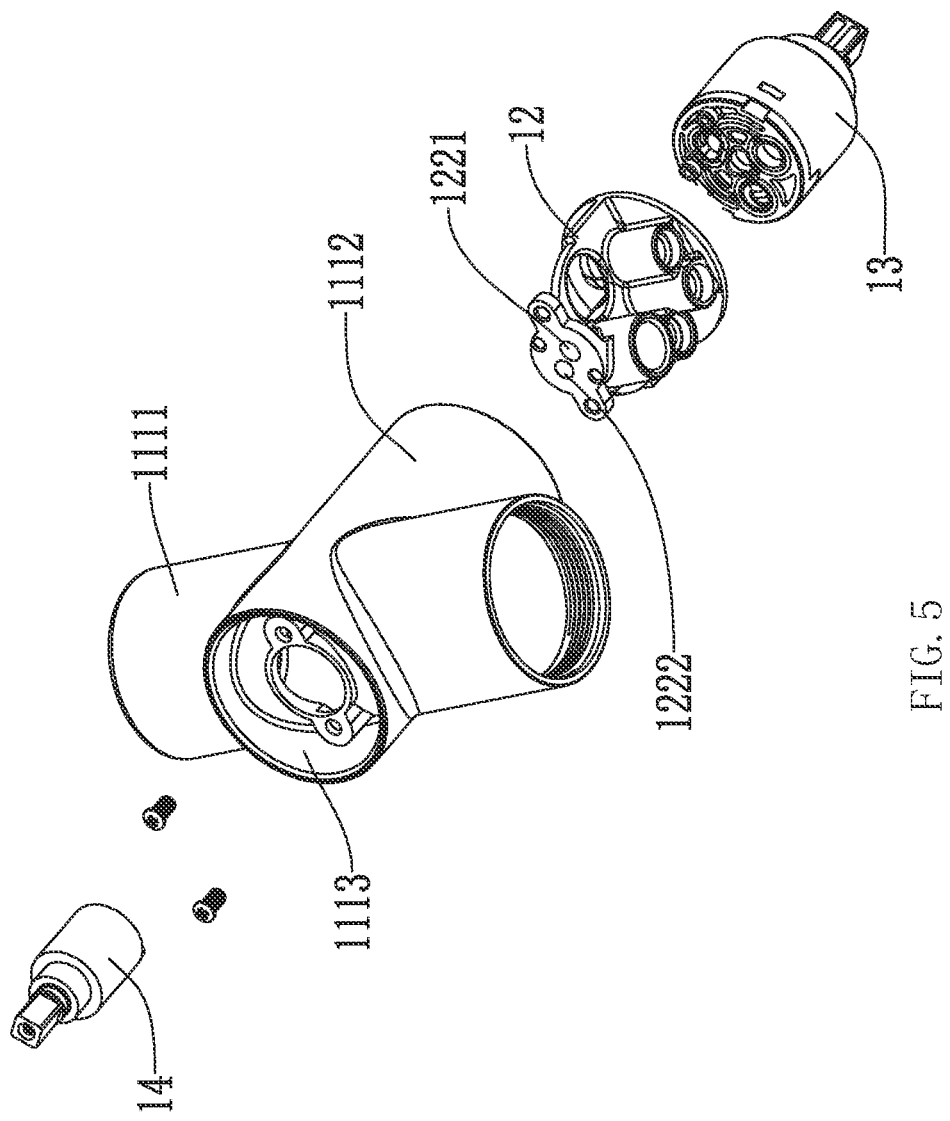
FIG. 5 illustrates a perspective view of the base, the valve seat, the first valve, and the second valve in a preferred embodiment in the present disclosure.

The present disclosure will be further described below in combination with the accompanying drawings and embodiments.

Referring to FIGS. 1 to 6, a faucet comprises a faucet body 1 and a water outlet panel 2. The faucet body 1 comprises a faucet housing 11, a valve seat 12, a first valve 13, and a second valve 14, and the valve seat 12, the first valve 13, and the second valve 14 are disposed in the faucet housing 11. The faucet housing 11 comprises a base 111 and a bent tube 112 connected to the base 111. The base 111 is disposed on a countertop of a kitchen sink. The base 111 comprises a vertical portion 1111 and a lateral portion 1112 connected to the vertical portion 1111, and the vertical portion 1111 and the lateral portion 1112 are connected together to form a cross-shaped structure that is hollow. The bent tube 112 is connected to a top of the vertical portion 1111, and a bottom of the vertical portion 1111 is correspondingly disposed on the countertop of the kitchen sink. The lateral portion 1112 comprises two openings 1113 located on two sides thereof, and the valve seat 12 is disposed at an intersection of the vertical portion 1111 and the lateral portion 1112. The valve seat 12 comprises a first mounting surface 121 facing a first one of the two openings 1113 and a second mounting surface 122 facing a second one of the two openings 1113, and the first valve 13 and the second valve 14 are respectively inserted into the two sides of the lateral portion 1112 from the two openings 1113 to be respectively connected to the first mounting surface 121 and the second mounting surface 122.

The valve seat 12 comprises a water passage connected to the first mounting surface 121 and the second mounting surface 122. The first mounting surface 121 comprises a first valve inlet 1211, a second valve inlet 1212, a first valve outlet 1213, and a second valve outlet 1214. The valve seat 12 further comprises a connecting member 124 facing downward, and the connecting member 124 comprises a hot water hole 1241 for receiving a hot water pipe, a cold water hole 1242 for receiving a cold water pipe, and a water outlet hole 1243 for receiving a pull-out pipe. The first valve inlet 1211 is in communication with the hot water hole 1241, the second valve inlet 1212 is in communication with the cold water hole 1242, the first valve outlet 1213 is connected to the water passage, and the water outlet hole 1243 is in communication with the second valve outlet 1214. The first valve 13 is connected to the first mounting surface 121. The first valve 13 comprises a first water inlet configured to correspond to the first valve inlet 1211, a second water inlet configured to correspond to the second valve inlet 1212, a first water outlet configured to correspond to the first valve outlet 1213, and a second water outlet configured to correspond to the second valve outlet 1214. The first valve 13 is configured to receive hot water and cold water through the first water inlet and the second water inlet and is configured to enable the hot water and the cold water to be mixed therein to form mixed water, and the mixed water is constantly in communication with the water passage. The first valve 13 is configured to be controlled to enable the mixed water to be in communication with the second water outlet.

The second mounting surface 122 comprises a third valve inlet 1221 and a third valve outlet 1222. The connecting member 124 further comprises a panel water outlet hole 1244 for receiving a panel water outlet pipe, and the third valve outlet 1222 is in communication with the panel water outlet hole 1244. The third valve inlet 1221 is connected to the water passage. The second valve 14 is connected to the second mounting surface 122. The second valve 14 comprises a third water inlet configured to correspond to the third valve inlet 1221 and a third water outlet configured to correspond to the third valve outlet 1222. The second valve 14 is configured to receive the mixed water from the water passage and enable the mixed water to be controlled to be in communication with the third valve outlet 1222.

The faucet body 1 further comprises the hot water pipe 151, the cold water pipe 152, and the pull-out pipe 153. The hot water pipe 151 is connected to the hot water hole 1241, and the cold water pipe 152 is connected to the cold water hole 1242. A first end of the pull-out pipe 153 is connected to the water outlet hole 1243. The valve seat 12 further comprises a passage 125, and a second end of the pull-out pipe 153 passes through the passage 125 and extends into the vertical portion 1111 and the bent tube 112. The second end of the pull-out pipe 153 extends out of a distal end of the bent tube 112 and is connected to a water outlet terminal 16 of the faucet body 1, and a user can grasp the water outlet terminal 16 and pull the water outlet terminal 16 to leave the distal end of the bent tube 112 and can adjust a water outlet direction of the water outlet terminal 16.

The faucet body 1 further comprises a first handle 131 connected to the first valve 13 and a second handle 141 connected to the second valve 14. The first handle 131 and the second handle 141 are configured to respectively control the first valve 13 and the second valve 14.

The water outlet panel 2 is configured to be arranged separately from the faucet body 1. The water outlet panel 2 is plate-shaped and comprises a bottom wall 21, a top wall 22, and a surrounding wall 23 connected to the bottom wall 21 and the top wall 22. An outer contour of the water outlet panel 2 is substantially in an oval shape. The water outlet panel 2 comprises a water outlet port 24 defined on the surrounding wall 23. The water outlet port 24 comprises a plurality of water outlet holes 241, and the plurality of water outlet holes 241 are arranged at intervals along a horizontal direction. The water outlet panel 2 comprises an inner passage and a water connecting hole 25 defined on the bottom wall 21, and the inner passage is connected to the water connecting hole 25 and the plurality of water outlet holes 241. The faucet further comprises the panel water outlet pipe 3 connected to the panel water outlet hole 1244 and the water connecting hole 25, and the mixed water flows through the panel water outlet pipe 3, the water connecting hole 25, and the inner passage to flow out of the plurality of water outlet holes 241. In this disclosure, the water outlet panel 2 is disposed on the countertop of the kitchen sink, a water outlet direction of the plurality of water outlet holes 241 faces the kitchen sink, and the plurality of water outlet holes 241 are arranged at intervals to form a large-width water outlet flow.

The water outlet panel 2 has the following two arrangement methods.

A first arrangement method: A middle part of the water outlet panel 2 comprises a through hole 26 extending therethrough along a thickness direction of the water outlet panel 2. The faucet body 1 comprises a threaded tube 17 connected to a bottom of the faucet housing 11, the water outlet panel 2 is arranged on the countertop of the kitchen sink, and the threaded tube 17 of the faucet body 1 passes through the through hole 26 from top to bottom to correspond to below the countertop of the kitchen sink. The water outlet panel 2 comprises two of the water connecting holes 25, and the two of the water connecting holes 25 are located on a left side and a right side of the through hole 26. The panel water outlet pipe 3 is connected to one of the water connecting holes 25, and the other one of the water connecting holes 25 can be plugged by a plug. The faucet body 1 is disposed on the water outlet panel 2, and the water outlet direction of the plurality of water outlet holes 241 faces the kitchen sink. The top wall 22 of the water outlet panel 2 has a decorative surface, and the color and the material of the top wall 22 are matched with those of the faucet housing 11.

The faucet body 1 further comprises a fastening member 18. The bottom of the faucet housing 11 is connected to the threaded tube 17, and the threaded tube 17 passes through the through hole 26 and is in threaded connection with the fastening member 18, so that the water outlet panel 2 is clamped and fixedly connected between the faucet housing 11 and the fastening member 18. The bottom of the faucet housing 11 correspondingly abuts the top wall 22 of the water outlet panel 2, and the bottom wall 21 of the water outlet panel 2 can correspondingly abut the countertop of the kitchen sink. The threaded tube 17 passes through the through hole 26 and corresponds to below the countertop of the kitchen sink, and the fastening member 18 is connected to the threaded tube 17 in a threaded manner and can abut a lower side of the countertop of the kitchen sink. The faucet housing 11 and the fastening member 18 respectively abut an upper side and the lower side of the countertop of the kitchen sink to achieve fixation of the water outlet panel 2.

Figure 6:
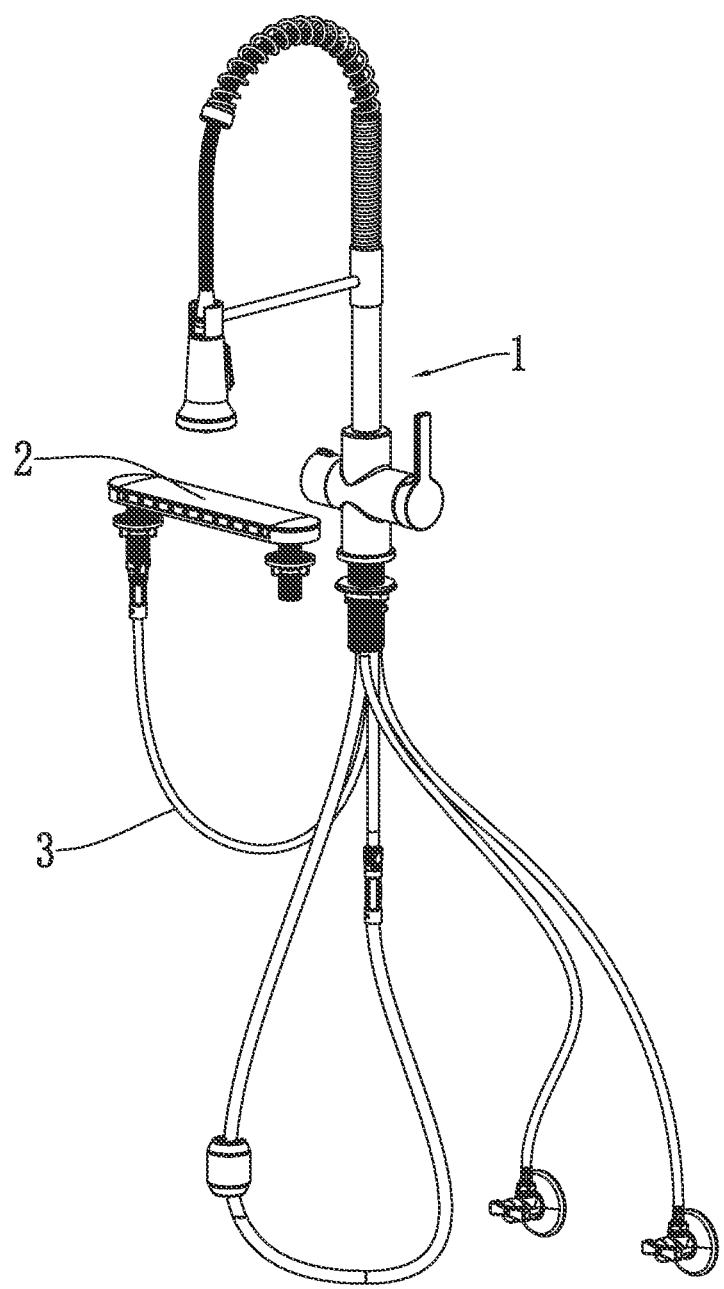
FIG. 6 illustrates a perspective view of a faucet in another embodiment in the present disclosure.

A second arrangement method: referring to FIG. 6, the water outlet panel 2 is arranged separately from the faucet body 1, and the water outlet panel 2 comprises the two of the water connecting holes 25. The two of the water connecting holes 25 are disposed on the left side and the right side of the water outlet panel 2. The water outlet panel 2 and the faucet body 1 are disposed on an edge of the kitchen sink, and the water outlet panel 2 and the faucet body 1 are disposed at different positions of the countertop of the kitchen sink, so that in this embodiment, the water outlet panel 2 and the faucet body 1 can respectively correspondingly be mounted on different positions of the kitchen sink and can be adapted to a multi-sink kitchen sink.

The panel water outlet pipe 3 is connected to one of the two of the water connecting holes 25, and the other one of the two of the water connecting holes 25 can be plugged by the plug. Thus, the water outlet panel 2 may be arranged on a left side or a right side of the faucet body 1, and the panel water outlet pipe 3 may be connected to an adjacent one of the two of the water connecting holes 25.

In use, a user can control the first valve 13 through the first handle 131 to mix the cold water and the hot water according to a specific proportion to form the mixed water, and the mixed water is in communication with the second valve 14 through the water passage. The user can control the second valve 14 through the second handle 141 so as to enable the mixed water to be in communication with the water outlet panel 2 and enable the water outlet panel 2 to output water. The user can also control the first valve 13 to enable the water outlet terminal 16 to output water.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A faucet, comprising:
a faucet body,
a water outlet panel, and
a panel water outlet pipe, wherein:
the water outlet panel is configured to be arranged separately from the faucet body,
the faucet body comprises a valve seat, a first valve, and a second valve,
the first valve and the second valve are respectively connected to the valve seat,
the panel water outlet pipe is connected to the valve seat and the water outlet panel to enable the second valve to be in communication with the water outlet panel,
the valve seat comprises a water passage respectively connected to the first valve and the second valve,
the first valve is in communication with hot water and cold water through the valve seat and is configured to be controlled to enable the hot water and the cold water to be mixed in a specific proportion to form mixed water that is in communication with the water passage,
the second valve is configured to receive the mixed water and is configure to be controlled to enable the mixed water to be in communication with the water outlet panel,
the faucet body comprises a water outlet terminal,
the water outlet panel comprises a water outlet port, and
the first valve is configured to be controlled to enable the mixed water to be in communication with the water outlet terminal.

2. The faucet according to claim 1, wherein:
the water outlet panel is configured to be disposed under the faucet body,
the water outlet panel comprises a through hole extending through the water outlet panel along a thickness direction of the water outlet panel, and
at least part of the faucet body is configured to pass through the through hole from top to bottom.

3. The faucet according to claim 2, wherein:
the faucet body comprises a faucet housing, a threaded tube, and a fastening member,
a bottom of the faucet housing is connected to the threaded tube,
the threaded tube is configured to pass through the through hole to be connected to the fastening member in a threaded manner, and
the water outlet panel is configured to be clamped and fixedly connected between the faucet housing and the fastening member.

4. The faucet according to claim 2, wherein:
the water outlet panel comprises two water connecting holes respectively located on a left side and a right side of the through hole,
the two water connecting holes are in communication with the water outlet port, and
the panel water outlet pipe is connected to the valve seat and at least one of the two water connecting holes.

5. The faucet according to claim 1, wherein:
the water outlet panel is disposed adjacent to a side of the faucet body and separately from the faucet body.

6. The faucet according to claim 5, wherein:
the water outlet panel comprises two water connecting holes located on two sides thereof,
the two water connecting holes are connected to the water outlet port, and
the panel water outlet pipe is connected to the valve seat and at least one of the two water connecting holes.

7. The faucet according to claim 1, wherein:
the water outlet port comprises a plurality of water outlet holes, and
the plurality of water outlet holes is arranged at intervals along a horizontal direction.

8. The faucet according to claim 1, wherein:
the valve seat comprises a first mounting surface and a second mounting surface,
the first mounting surface is configured for the first valve to be disposed thereon,
the second mounting surface is configured for the second valve to be disposed thereon,
the water passage is connected to the first mounting surface and the second mounting surface,
the valve seat further comprises a panel water outlet hole configured for receiving the panel water outlet pipe and connected to the second mounting surface, and
the panel water outlet pipe is connected to the panel water outlet hole.

9. The faucet according to claim 8, wherein:
the valve seat is disposed in a faucet housing of the faucet body,
the panel water outlet hole faces a bottom of the faucet housing, and
the panel water outlet pipe is configured to pass by the bottom of the faucet housing to be connected to the panel water outlet hole.

10. The faucet according to claim 9, wherein:
the water outlet panel comprises at least one water connecting hole defined on a bottom wall of the water outlet panel,
the faucet body and the water outlet panel are configured to be disposed on a countertop of a kitchen sink,
the panel water outlet pipe is configured to be located below of the kitchen sink,
a first end of the panel water outlet pipe is connected to the panel water outlet hole, and
a second end of the panel water outlet pipe is connected to the at least one water connecting hole.

* * * * *